June 28, 1960
W. W. BALDING
2,942,870
MOTOR VEHICLE AXLE MOUNTINGS
Filed April 21, 1958
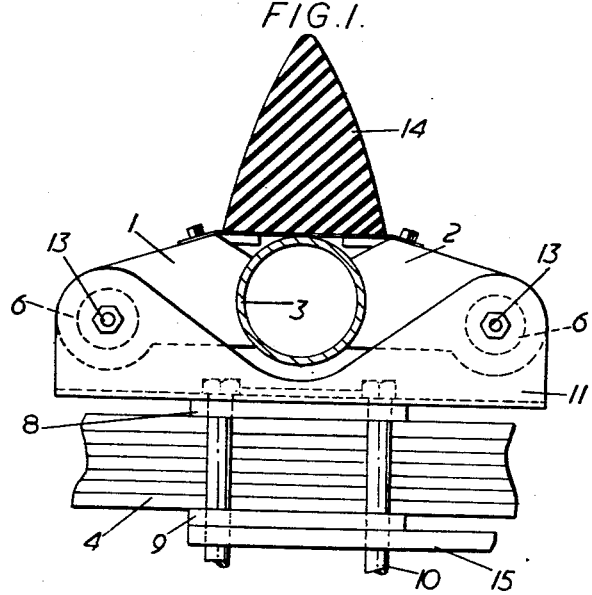
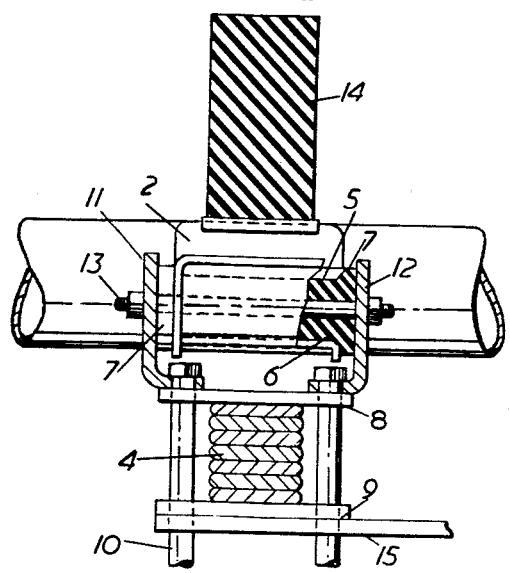
Inventor
Walter W. Balding
By
Attorneys United States Patent Office 2,942,870
Patented June 28, 1960

2,942,870
MOTOR VEHICLE AXLE MOUNTINGS

Walter W. Balding, Woodstock, England, assignor to Morris Motors Limited, Oxford, England Filed Apr. 21, 1958, Ser. No. 729,746

Claims priority, application Great Britain May 4, 1957

2 Claims. (Cl. 267—52)

This invention relates to axle mountings or suspension assemblies for motor vehicles, of the kind comprising an axle structure associated with a pair of laminated suspension springs which are disposed at opposite sides of, and substantially parallel to, the median longitudinal plane of the vehicle.

It is common practice for the axle beam or casing, as the case may be, to be bolted to the laminated springs with rubber seating pads interposed. These pads, which are necessarily made of a hard-grade rubber (usually having a Shore durometer hardness of about 70–80) and therefore cannot effectively suppress the transmission of mechanical vibrations, merely serve to obviate the squeaking of metal against metal which would be liable to occur in their absence. The inherent inability of the hard rubber pads to absorb or damp vibrations to any marked extent is accentuated by the effect of tightening the nuts of the bolts by which the axle structure is anchored to the springs.

The aim of the invention is to enable axle mountings or suspension assemblies for motor vehicles, of the kind specified above, to be designed in such a way as to effect a considerable reduction in the transmission of extraneous vibrations, such as road-generated noise, to the body of the vehicle. This is achieved, according to the invention, by providing the axle structure and the suspension springs with mutually overlapping mounting brackets which are maintained out of metallic contact with each other and which are interconnected at opposite sides of the axle structure by pins or bolts passing through bushes of "medium soft" grade rubber (i.e. having a Shore durometer hardness of about 40–50) the ends of which extend into the gaps between the adjacent sides of the respective brackets and can expand radially within those gaps when the securing nuts are tightened.

The preferred manner of applying the invention to a rear suspension system of a motor vehicle will now be described with reference to the accompanying drawings, in which:

Figure 1 is an end elevation of the improved rear axle mounting assembly; and

Figure 2 is a corresponding side view.

Two pairs of steel brackets as at 1 and 2, somewhat of inverted trough-like form, are welded to the axle casing 3, each pair being located where the corresponding laminated suspension spring as at 4, is to be fitted. One bracket 1 of each pair projects in front of the axle casing, and the other 2 projects behind the casing and in alignment with the front bracket. At its outer end, each bracket has a transverse steel tube 5 (Fig. 2) interconnecting the sides of the bracket and providing a housing for a rubber bush 6. The latter is of "medium soft" grade (as defined above) and, when fitted in place, protrudes from both ends of its tubular housing 5. If desired, instead of having a single rubber bush with plain ends, a pair of abutting half-length bushes having their outer ends flanged, as at 7, may be employed.

The central zone of each laminated suspension spring 4 is clamped between upper and lower locating plates 8 and 9 having four securing bolts 10. These bolts also serve to secure two angle brackets 11 and 12 projecting upwardly from the upper locating plate 8, and at opposite sides of it. As can be seen from Figure 1, the angle brackets 11 and 12 are shaped to afford adequate clearance beneath the axle casing 3 and, when the respective mounting brackets are juxtaposed, the brackets 1 and 2 on the axle casing lie between the end zones of the angle brackets 11 and 12, with the projecting ends 7 of the rubber bushes 6 interposed. Retaining pins or bolts 13 are then inserted through holes in the angle brackets 11 and 12 aligned with the bores of the rubber bushes 6.

The usual rubber bump pads, as at 14, may conveniently be mounted on top of the axle casing brackets 1 and 2. The component 15 is a mounting plate for a shock absorber (not shown).

As is customary, the eyes (not shown) of the laminated suspension springs 4 are fitted with rubber bushes.

I claim:

1. An axle mounting for a vehicle of the type having an axle assembly and suspension spring assembly, in which each of said assemblies is provided with a mounting bracket having two opposed flanges extending transversely to the longitudinal axis of said axle, the flanges on one bracket being closer together than and interposed between the flanges of the other bracket, the outermost flanges being spaced from the innermost flanges in a direction parallel to said longitudinal axis to define longitudinal gaps therebetween, said flanges being interconnected at opposite sides of the axle assembly by pins parallel to the longitudinal axis of said axles seated in the outermost flanges and surrounded between the outermost flanges by a resilient bush, the ends of which bush extend through the innermost flanges and into said gaps so that they may expand radially therewithin when the outermost flanges are tightened along said pins and permanently space the inner bracket from the pin and the outer bracket to form a resilient cushion therebetween.

2. An axle mounting as claimed in claim 1, in which said bush is made of a material having a Shore hardness between 40 and 50.

References Cited in the file of this patent

UNITED STATES PATENTS

| 2,309,812 | Utz | Feb. 2, 1943 |
| 2,345,448 | Best | Mar. 28, 1944 |
| 2,650,818 | Martin | Sept. 1, 1953 |

FOREIGN PATENTS

| 558,926 | France | June 5, 1923 |